(12) United States Patent
Tiwari et al.

(10) Patent No.: US 7,959,112 B2
(45) Date of Patent: Jun. 14, 2011

(54) WHEEL DETECTION AND CLASSIFICATION SYSTEM FOR RAILROAD DATA NETWORK

(75) Inventors: Arvind Kumar Tiwari, Bangalore (IN); Ramasamy Anbarasu, Bangalore (IN); Ramesh Bhat, Bangalore (IN); Somakumar Ramachandrapanicker, Bangalore (IN); Vageesh Kubatoor Patil, Bangalore (IN); Carlo Becheri, Florence (IT); Stefano Orlandi, Florence (IT); Fabio Biondi, Florence (IT); Lorenzo Chiosi, Florence (IT)

(73) Assignee: Progress Rail Services Corp, Albertville, IL (US)

( * ) Notice: Subject to any disclaimer, the term of this patent is extended or adjusted under 35 U.S.C. 154(b) by 661 days.

(21) Appl. No.: 11/642,266

(22) Filed: Dec. 20, 2006

(65) Prior Publication Data

US 2008/0149782 A1    Jun. 26, 2008

(51) Int. Cl.
 *B61L 11/00* (2006.01)
(52) U.S. Cl. .................. 246/122 R; 246/247; 246/249
(58) Field of Classification Search ............ 246/122 R, 246/249, 124, 167 R, 247; 324/173, 174, 324/179, 207.2, 251; 340/941
See application file for complete search history.

(56) References Cited

U.S. PATENT DOCUMENTS

| | | | |
|---|---|---|---|
| 3,697,745 A | 10/1972 | Bolton | |
| 4,155,526 A * | 5/1979 | Noble | 246/249 |
| 4,236,093 A | 11/1980 | Birnbaum | |
| 4,379,330 A | 4/1983 | Sanville | |
| 4,731,579 A * | 3/1988 | Petersen et al. | 324/207.24 |
| 4,936,529 A | 6/1990 | Maine | |
| 5,628,479 A | 5/1997 | Ballinger | |
| 6,337,640 B2 * | 1/2002 | Lees | 340/933 |
| 7,481,400 B2 * | 1/2009 | Appleby et al. | 246/249 |
| 2004/0122616 A1 | 6/2004 | Kumar et al. | |

FOREIGN PATENT DOCUMENTS

JP    09062984    * 3/2009

* cited by examiner

*Primary Examiner* — Mark T Le
(74) *Attorney, Agent, or Firm* — Finnegan, Henderson, Farabow, Garrett & Dunner LLP; Patrick S. Yoder

(57) ABSTRACT

A system for detecting and classifying a wheel of a rail vehicle traveling on a railway track includes a plurality of wheel detectors coupled to one rail of the railway track and configured to detect presence of the wheel and to generate signals representative thereof. A processing system is coupled to the wheel detectors and configured to receive and process the signals. The processing system is configured to classify the wheel based on a speed independent classification value calculated based on the signals from the wheel detectors.

18 Claims, 19 Drawing Sheets

WHEEL DETECTION AND CLASSIFICATION SYSTEM FOR RAILROAD DATA NETWORK

BACKGROUND

The invention relates generally to a rail network system, and more particularly to a wheel detection and classification system, and a method for detecting and classifying wheels of rail vehicles using such a system.

In the railroad industry, it is often considered desirable to be able to detect and respond to rail vehicle passing a predetermined location. For example, a wide variety of devices may be used in the rail industry for different purposes, such as locomotives, trolleys and so forth. Associated equipment may be used, for example, to detect a train entering a station and provide a signal indicating where to stop so that the cars are in the most propitious location. Such equipment may also be used in a switch yard to count cars and assist in preventing placing too many cars on a specific track. Detectors may also be used to identify a train approaching a grade crossing in order to provide suitable warning signals.

A wide variety of techniques have been employed in the design and operation of such an equipment. For example, light beams and photo detectors cells, weight detectors, light reflecting devices, and magnetic devices have been used. Wheel detectors are employed as key components of various control systems used in railways, including grade crossing warning control systems, hot box detectors, and control systems utilized in hump yards. Wheel detectors require a higher degree of reliability to detect the presence or passing of a car wheel in a safe mode. That is, the detector should recognize failures and unwanted conditions and events so that the control system in which it functions can produce an appropriate warning or take other action. In current railway scenarios, there is a greater need to manage the railway assets to maximize their cost-effective performance.

Managing railway assets could benefit from an ability to differentiate wheels of different dimensions, thereby providing a capacity able to distinguish various types of vehicles on rail tracks, such as trains, push trolleys, dip lorries, rail dollies, and the like. Currently known wheel detection systems, however, are incapable tracking, classifying, and analyzing assets used both in and out of the rail yard.

There is a need for systems and methods capable of classifying rail car wheels of varied sizes. Also, there is a need for systems that are capable of improving the asset management operations through suppression of transit sequences made by maintenance vehicles such as trolleys or dollies.

BRIEF DESCRIPTION

In accordance with one exemplary embodiment of the present invention, a system for detecting and classifying a wheel of a rail vehicle traveling on a railway track is provided. The system includes a plurality of wheel detectors coupled to one rail of the railway track and configured to detect presence of the wheel and to generate signals representative thereof. A processing system is coupled to the wheel detectors and configured to receive and process the signals. The processing system is configured to classify the wheel based on a speed independent classification value calculated based on the signals from the wheel detectors.

In accordance with another embodiment of the present invention, a system for detecting a wheel size of at least one wheel of a rail vehicle traveling on a railway track is provided. The system includes a plurality of wheel detectors coupled to one rail of the railway track and configured to detect presence of the wheel and to generate signals representative thereof. A processing system is coupled to the wheel detectors and configured to receive and process the signals. The processing system is configured to determine a diameter of the wheel based on a magnetic sweep length of the signals.

In accordance with yet another exemplary embodiment of the present invention, a system for verifying classification of at least one wheel of a rail vehicle traveling on a railway track is provided. The system includes a plurality of wheel detectors coupled to one rail of the railway track and configured to detect presence of the wheel and to generate signals representative thereof. A processing system is coupled to the wheel detectors and configured to receive and process the signals. The processing system is configured to verify classification of the wheel based on the signals from the wheel detectors.

In accordance with yet another embodiment of the present invention, a method for verifying classification of at least one wheel of a rail vehicle traveling on a railway track includes generating signals representative of presence of the wheel via a plurality of wheel detectors. The signals from the plurality of wheel detectors are transmitted to a processing system. The method further includes processing the signals from the plurality of wheel detectors to verify classification of the wheel.

DRAWINGS

These and other features, aspects, and advantages of the present invention will become better understood when the following detailed description is read with reference to the accompanying drawings in which like characters represent like parts throughout the drawings, wherein.

Figure 20:
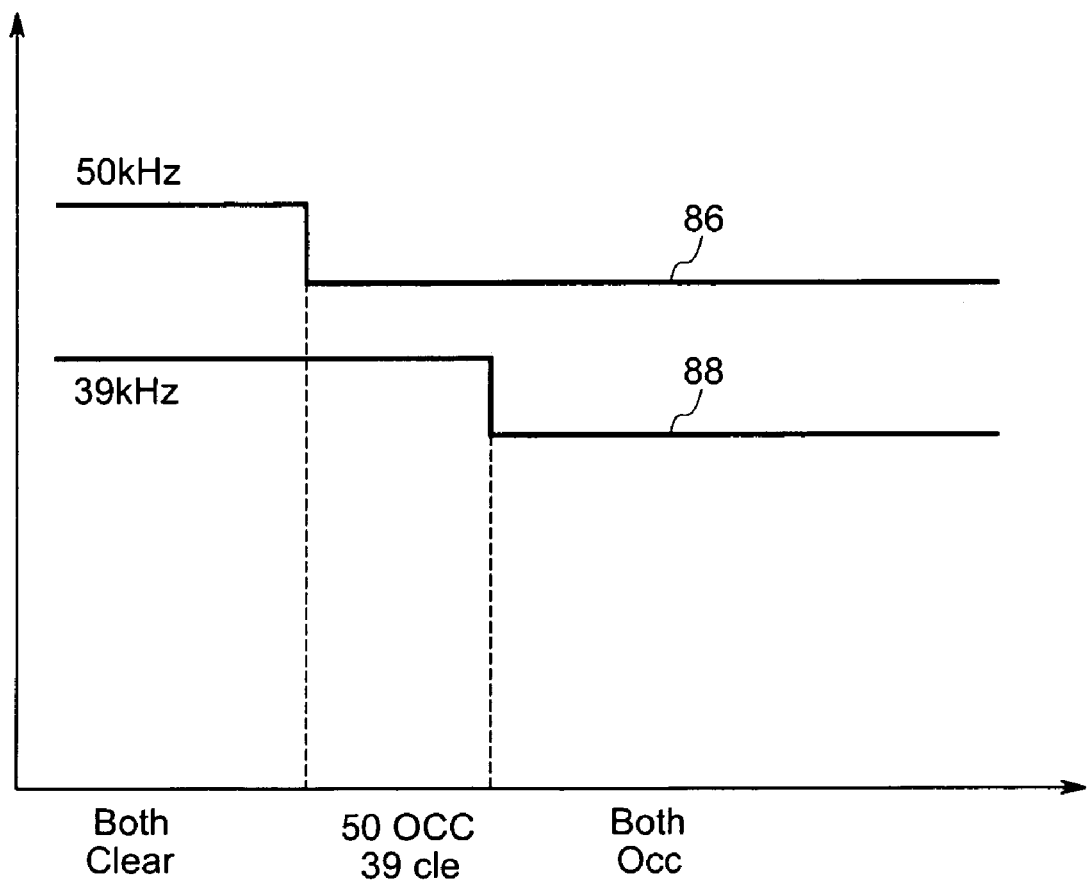
Figure 21:
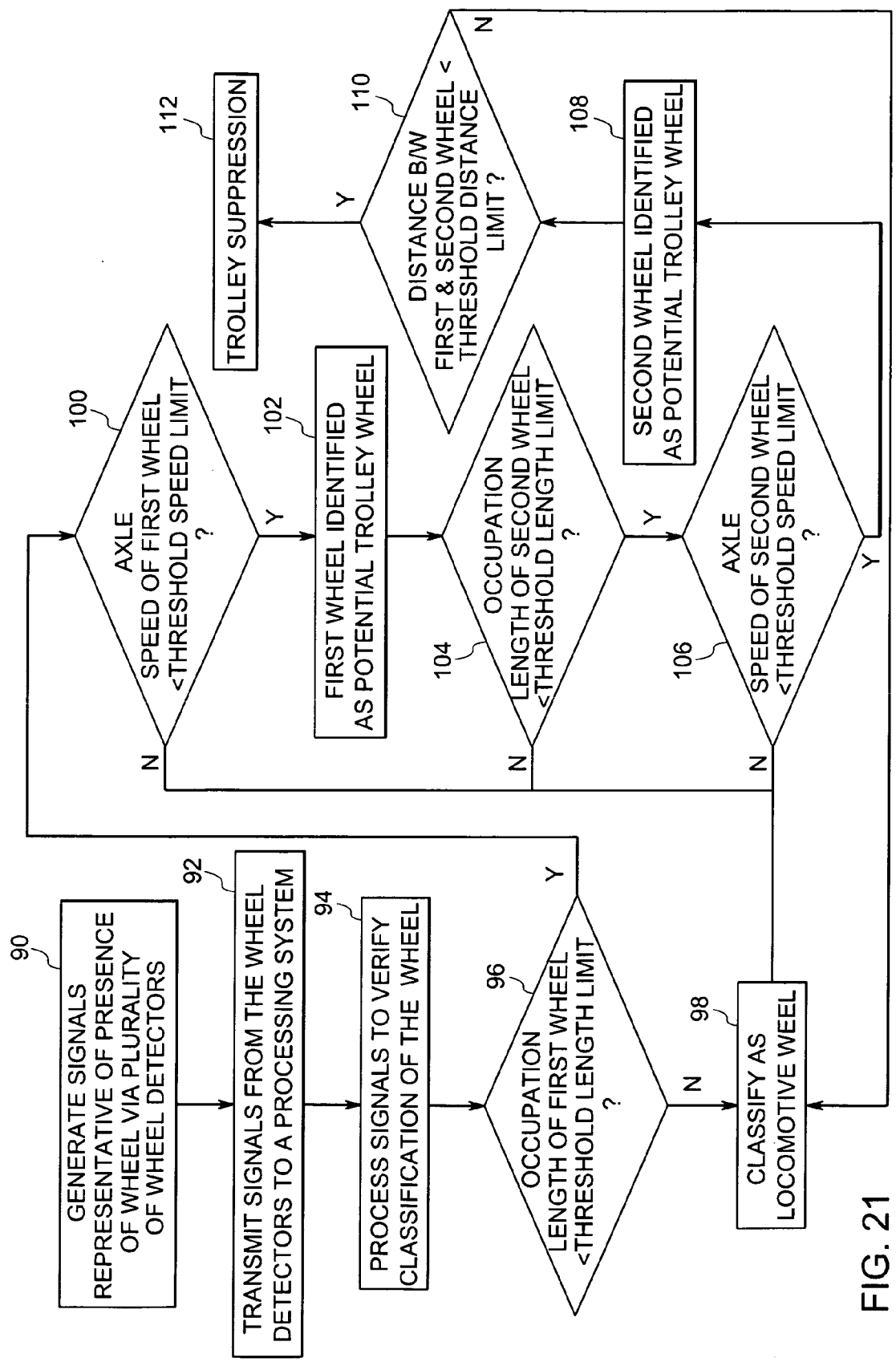

FIG. 20 is a graphical illustration of pulse signals as a function of time for a sequence generated by a failure that causes permanent occupation on two wheel detectors simultaneously in accordance with an exemplary embodiment of the present technique; and FIG. 21 is a flow chart illustrating exemplary steps involved in a method of declassifying or disqualifying classification of trolley wheels in accordance with an exemplary embodiment of the present technique.

DETAILED DESCRIPTION

As discussed in detail below, embodiments of the present invention provide a system and a method for detecting and classifying a wheel of a rail vehicle moving along a railway track. A plurality of wheel detectors are coupled to one rail of the railway track and are configured to detect presence of the wheel and generate signals representative of the presence of the wheel. A processing system is configured to receive and process the signals. The processing system classifies the wheel based on a speed independent classification value calculated based on the signals from the wheel detectors. In certain exemplary embodiments, the processing system is configured to determine a diameter of the wheel based on a magnetic sweep length of the signals. Moreover, the processing system may be configured to verify classification of the wheel based on the signals from the wheel detectors. The system in accordance with embodiments of the present invention thus facilitates classifying wheels depending on the wheel size. In particular, wheels of different dimensions are differentiated, thereby permitting various vehicles to be distinguished from one another on the railway track, such as push trolleys, motor trolleys, dip lorries, and rail dollies, locomotives, and so forth. The system facilitates determination of whether tracks are clear based upon such determinations. Specific embodiments of the present invention are discussed below referring generally to FIGS. 1-21.

Figure 1:
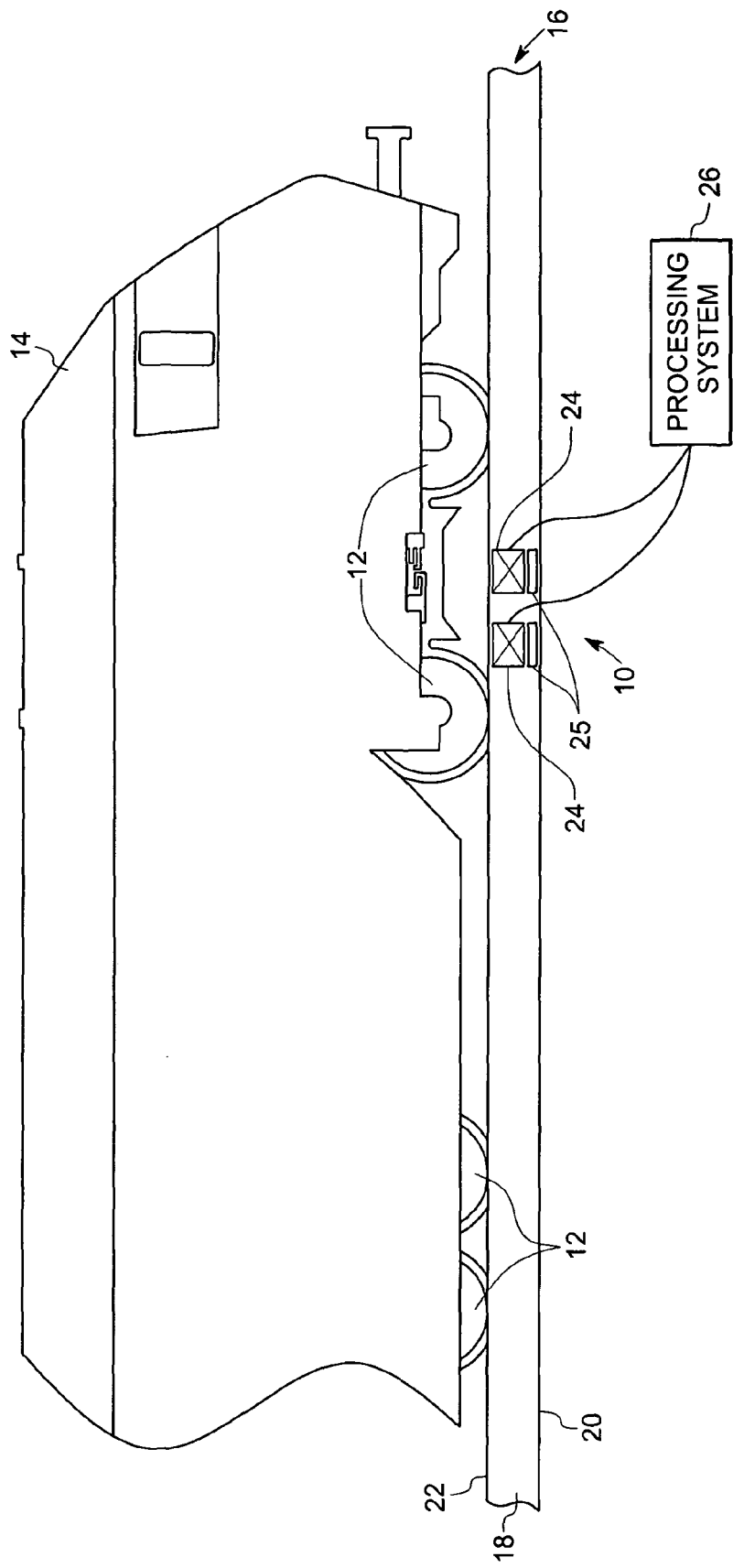
FIG. 1 is a diagrammatical view of a system for detecting and classifying wheels of rail vehicles traveling on a railway track in accordance with an exemplary embodiment of the present technique.

Referring to FIG. 1, an exemplary system 10 for detecting and classifying a plurality of wheels 12 of a rail vehicle 14 (e.g., a locomotive) traveling on a railway track 16 in accordance with the aspects of the present invention is illustrated. One rail 18 of the railway track 16 illustrated fragmentarily, has a base portion 20 and a top portion 22 on which the wheels 12 of the rail vehicle 14 ride. The system 10 includes a plurality of magnetic wheel detectors 24 (for example, a pair of detectors) coupled to the base portion 20 of the rail 18. The wheel detectors 24 are configured to detect the presence of the wheel 12 on the railway track 16 and to generate signals representative of the presence of the wheel 12. A corresponding driver unit 25 is provided for each wheel detector 24 and coupled to the base portion 20 of the rail 18. A processing system 26 is coupled to the wheel detectors 24 and is configured to receive and process the signals from the wheel detectors 24. In one exemplary embodiment, the processing system 26 is configured to classify the wheel based on the wheel size. In another exemplary embodiment, the processing system 26 is configured to determine a diameter of the wheel 12 based on a magnetic sweep length of the signal. In yet another exemplary embodiment, the processing system 26 is configured to verify classification of the wheel 12 based on the signals from the wheel detectors 24. Details of the system 10 and the various embodiments are explained in greater detail with reference to subsequent figures.

Figure 2:
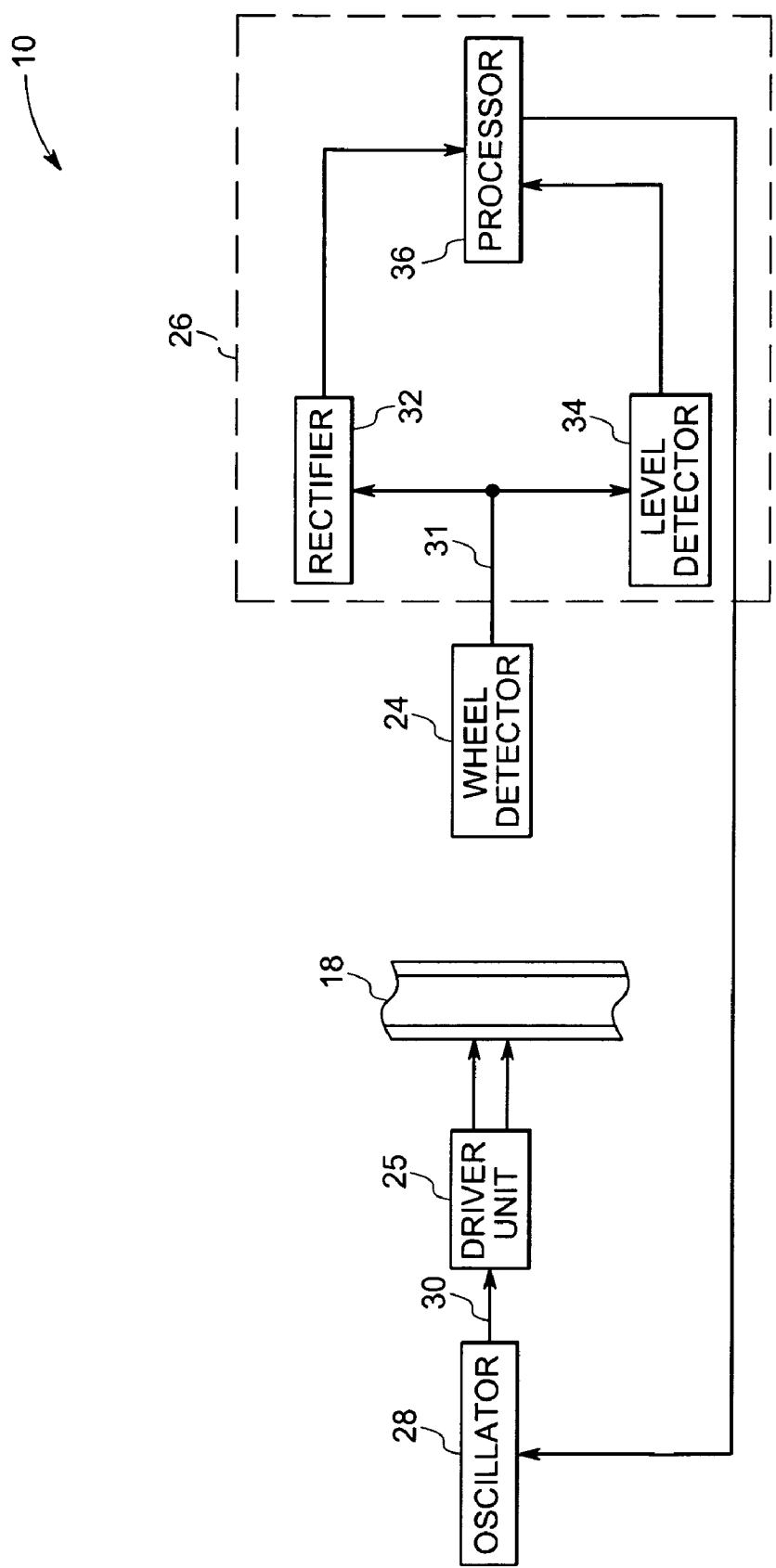
FIG. 2 is a block diagram of a system for detecting and classifying wheels of rail vehicles traveling on a railway track in accordance with an exemplary embodiment of the present technique.

Referring to FIG. 2, the system 10 is illustrated in accordance with a presently contemplated embodiment of the present invention. In the illustrated embodiment, a power source (i.e. oscillator) 28 is coupled to the driver unit 25 via a cable 30. The wheel detector 24 is coupled via a cable 31 to a rectifier 32 and a level detector 34. Output signals from both the rectifier 32 and the level detector 34 are delivered to a processor 36. It should be noted that the rectifier 32, the level detector 34, and the processor 36 are components of the processing system 26.

Electric power may be supplied from a trackside power source (not shown) to the processing system 26. The output of the processor 36 is coupled to a control system (not shown) such as a grade crossing warning control system. As discussed earlier, the function of the system 10 includes classifying wheels based on wheel size, determining diameter of the wheel, and also verify classification of wheels.

In the illustrated embodiment, primary windings (not shown) of the pair of detectors 24 are excited at different frequencies via the (high frequency) oscillator 28. In certain embodiments, an AC current source may be used. Variation in induced voltage in secondary windings (not shown) of the detectors 24 due to the excited primary windings and the presence of the wheel on the railway track is detected and processed by the processing system 26. The system 26 processes the two secondary voltage signals and generates a signal representative of the presence and classification of the wheel to the grade crossing warning control system.

Figure 3:
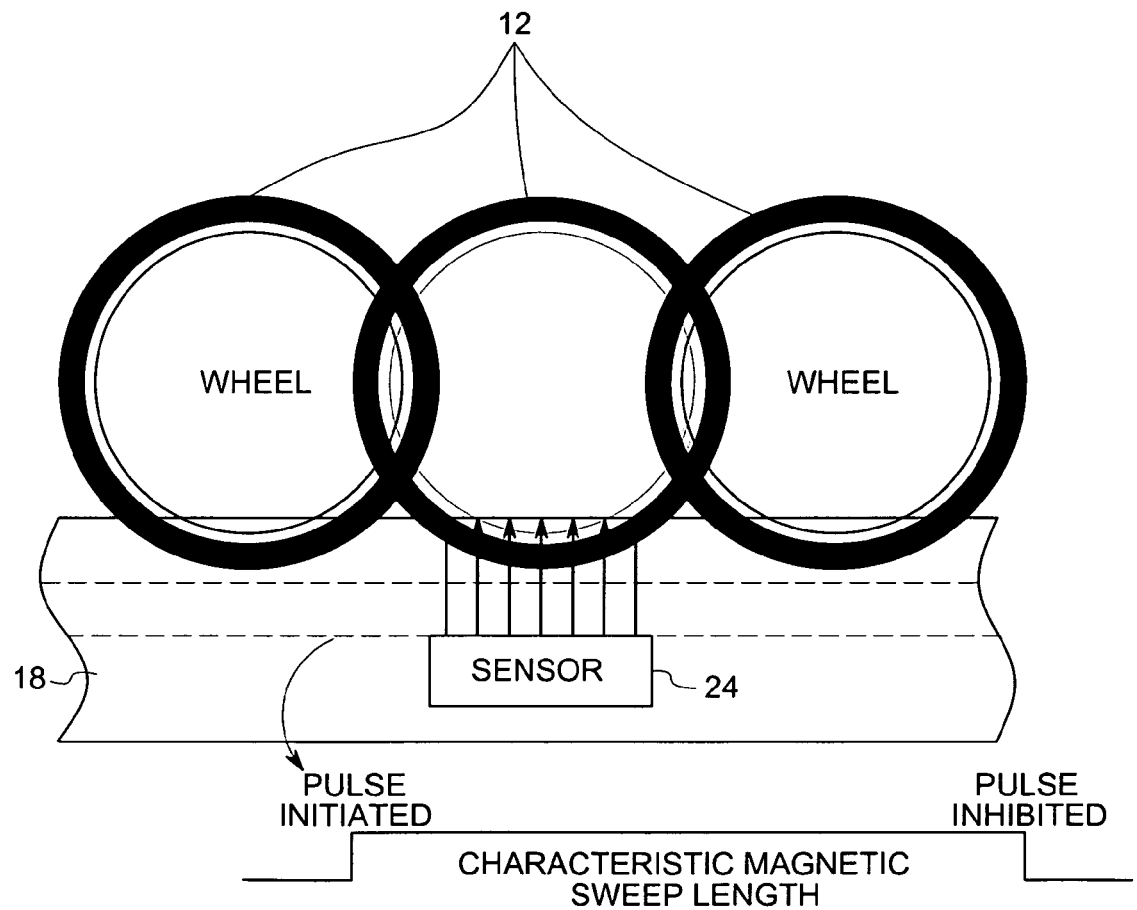
FIG. 3 is a diagrammatical view of a pulse signal transmitted from a wheel detector in accordance with an exemplary embodiment of the present technique.

Referring to FIG. 3, a pulse signal is illustrated in accordance with certain embodiments of the present invention. As discussed with reference to FIG. 2, variation in induced voltage in secondary windings (not shown) of the detectors 24 due to the excited primary windings and the presence of the wheel on the railway track is detected and processed by the processing system 26. The presence of the wheel 12 is determined based on the principle of electromagnetic induction (i.e., eddy current generated within wheel flange due to varying flux of the wheel detector). The eddy current loss within the wheel flange leads to apparent reduction of oscillator current, thereby enabling detection of the presence of the wheel. In the illustrated embodiment, a "magnetic sweep length" of the signal from the wheel detector 24 depends on the particular size (diameter) of the wheel 12 crossing the wheel detector 24. The "magnetic sweep length" may be referred to as the characteristic length (chord length) of the wheel 12 in contact with the detector 24 during passing of the wheel 12 over the wheel detector 24. The wheel diameter is a function of the magnetic sweep length. In other words, when the diameter of the wheel increases, the magnetic sweep length also increases. In the illustrated embodiment, the difference in magnetic sweep lengths of the secondary voltage signals from the wheel detectors may be used to classify the wheels based on the wheel size.

Figure 4:
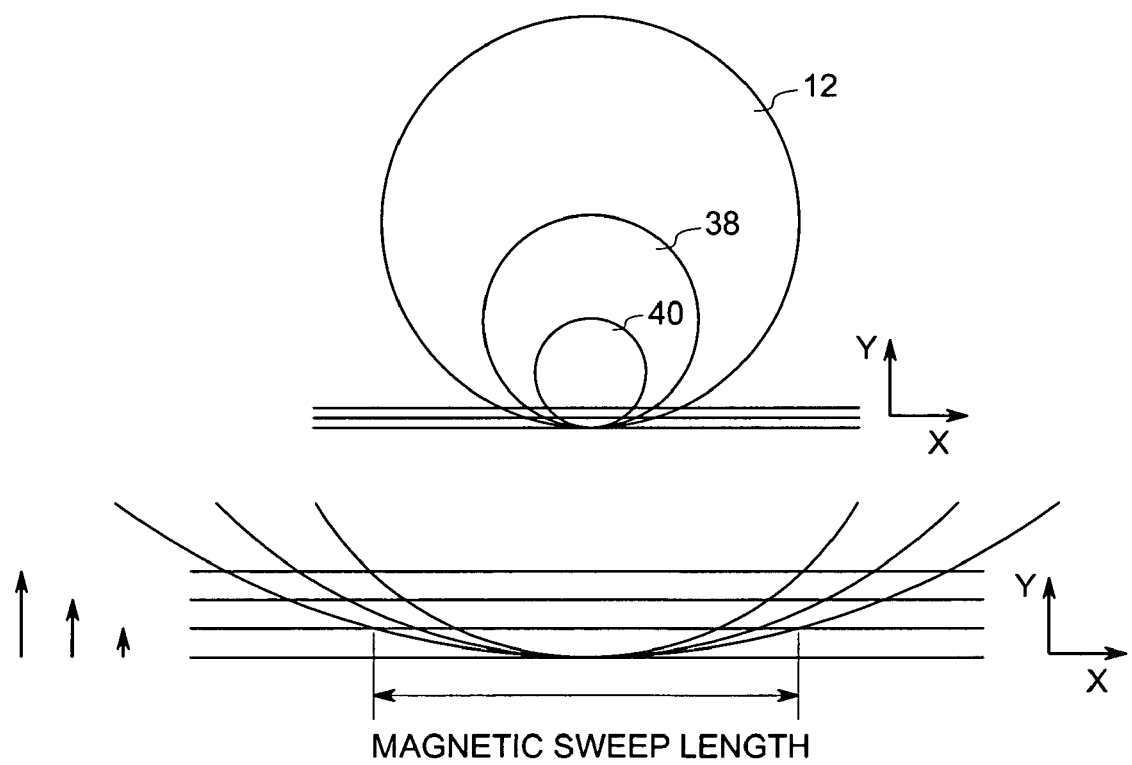
FIG. 4 is a diagrammatical view illustrating a characteristic magnetic sweep length as a function of wheel diameter used to determine wheel size in accordance with an exemplary embodiment of the present technique.

Referring to FIG. 4, a characteristic magnetic sweep length as a function of wheel diameter used to determine wheel size is illustrated. As discussed above, the presence of the wheel 12 is determined based on the principle of electromagnetic induction (i.e. eddy current generated within wheel flange due to varying flux of the wheel detector). The eddy current loss within the wheel flange leads to apparent reduction of oscillator current, thereby enabling detection of the presence of the wheel. Again, it may be seen that the wheel diameter is a function of the magnetic sweep length.

In FIG. 4, three wheels, such as a rail vehicle wheel 12, a push trolley wheel 38, and a rail dolley wheel 40 are illustrated. In one example, if the chord length of the locomotive wheel 12 in contact with the detector is 233 mm, the magnetic sweep length may be 267 mm. If the chord length of the locomotive wheel 12 in contact with the detector is 247 mm, the magnetic sweep length may be 284 mm.

In the illustrated embodiment, when the chord length of the push trolley wheel 38 in contact with the detector is 141 mm, the magnetic sweep length may be 171 mm. If the chord length of the trolley wheel 38 in contact with the detector is 147 mm, the magnetic sweep length may be 177 mm. When the chord length of the rail dolley wheel 40 in contact with the detector is 113 mm, the magnetic sweep length may be 138 mm. If the chord length of the dolley wheel in contact with the detector is 118 mm, the magnetic sweep length may be 143 mm. It should be noted herein that the above-mentioned examples of magnetic sweep length are exemplary values and may vary depending on the application.

Figure 5:
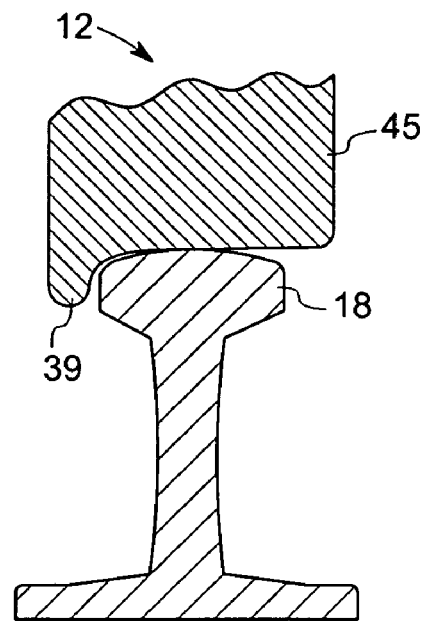
FIG. 5 is a diagrammatical view illustrating interaction between a wheel flange, and a wheel base of the locomotive wheel with the rail in accordance with certain exemplary embodiments of the present technique.
Figure 6:
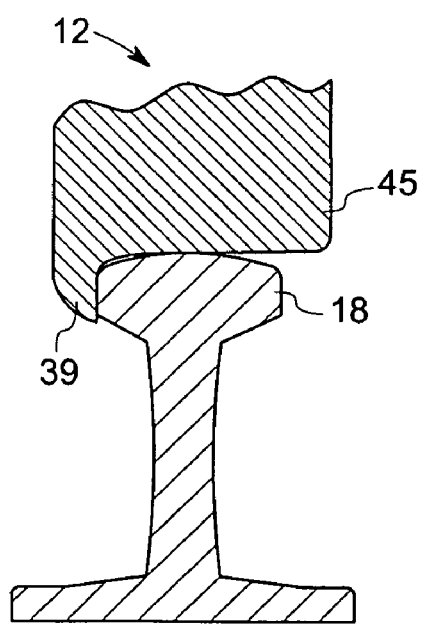
FIG. 6 is a diagrammatical view illustrating interaction between a wheel flange, and a wheel base of the locomotive wheel with the rail in accordance with certain exemplary embodiments of the present technique.

Referring to FIG. 5, interaction between a wheel flange 39, and a wheel base 45 of the locomotive wheel 12 with the rail 18 in accordance with certain embodiments of the present invention is illustrated. In the illustrated embodiment, the wheel 12 is in normal condition. Referring to FIG. 6, interaction between the wheel flange 39, and the wheel base 45 of the locomotive wheel 12 with the rail 18 in accordance with certain embodiments of the present invention is illustrated. In the illustrated embodiment, the wheel 12 is in worn-out condition. The exemplary processing system 26 is configured to determine "wheel wear condition". As discussed previously, the wheel diameter is a function of the magnetic sweep length. It should be noted herein that the interaction between the wheel flange 39, wheel base 45, and the wheel detector increases due to worn-out condition of the wheel. As a result, the magnetic sweep length of the signal from the wheel detector also increases. The worn-out condition of the wheel may be determined by comparing the estimated magnetic sweep length with the predetermined magnetic sweep length of a normal condition wheel.

Figure 7:
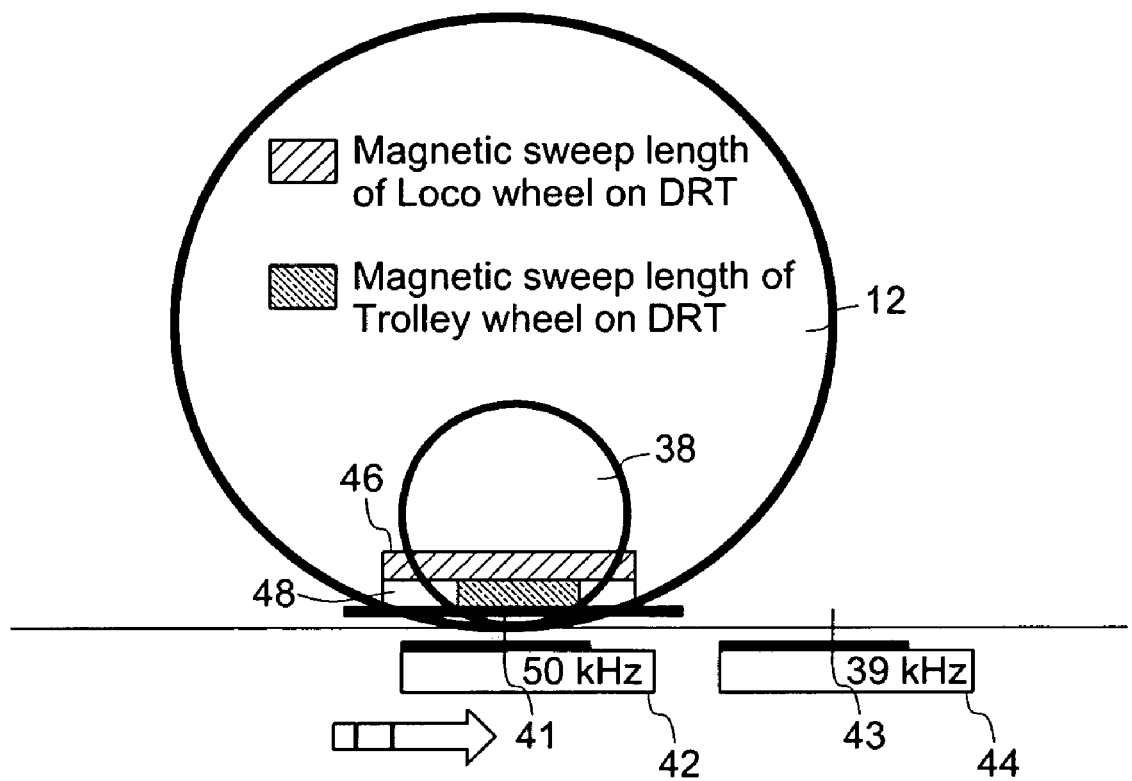
FIG. 7 is a diagrammatical view of magnetic sweep lengths of a locomotive wheel and a trolley wheel used to determine the sizes for such wheels in accordance with an exemplary embodiment of the present technique.

Referring to FIG. 7, exemplary magnetic sweep lengths of the locomotive wheel 12 and a trolley wheel used to determine the sizes for such wheels in accordance with certain embodiments of the present invention are illustrated. In the illustrated embodiment, a pair of magnetic wheel detectors 42, 44 having excitation frequencies of 50 KHz and 39 KHz respectively are illustrated. A first centerpoint and second centerpoint of the detectors 42, 44 respectively are represented by the reference numerals 41, 43. The pair of wheel detectors 42, 44 are coupled to one rail of the railway track. The locomotive wheel 12 and the trolley wheel 38 are shown positioned over the wheel detector 42.

As discussed above, the wheel diameter is a function of the magnetic sweep length. For wheels of relatively greater diameter, a proportionately greater magnetic sweep length will be detected. In the illustrated embodiment, magnetic sweep lengths 46, 48 correspond to the locomotive wheel 12 and the trolley wheel 38, respectively. The magnetic sweep length 46 corresponding to the locomotive wheel 12 is greater than the magnetic sweep length 48 corresponding to the trolley wheel 38. The pulse width of the signal representative of the wheel presence from the wheel detectors 42, 44 is a function of the magnetic sweep length, detector excitation frequency, and the linear velocity of the wheel. As noted above, the magnetic sweep length is a function of the diameter of the wheel. In certain exemplary embodiments, the magnetic sweep length is independent of the velocity of the wheel. The exemplary steps involved in determination of the magnetic sweep length independent of velocity of the wheel, is explained in greater detail in subsequent paragraphs.

In certain exemplary embodiments, the processing system 26 is configured to monitor the operating condition of the wheel detectors 42, 44 based on the ratio of magnetic sweep length $(L_{mag})_R$ of the signals from the detectors 42, 44. In the illustrated embodiment, the operating condition of the detectors 42, 44 is determined based on the following relation:

$$(L_{mag})_R = \frac{(L_{mag})_{50}}{(L_{mag})_{39}}$$

where $(L_{mag})_{50}$ is the magnetic sweep length of the signal from the detector 42 and $(L_{mag})_{39}$ is the magnetic sweep length of the signal from the detector 44. For normal operating conditions of the detectors 42, 44, the ratio of the magnetic sweep length $(L_{mag})_R$ is either constant or varies within predetermined limits. For abnormal operating conditions of the detectors, the ratio of the magnetic sweep length $(L_{mag})_R$ tends towards zero, or any abnormal values. It should be noted herein that in certain other exemplary embodiments, the transit sequence of the wheel over the detectors 42, 44 may vary, i.e. the wheel first passes over the detector 44 and then over the other detector 42. As a result, the ratio of magnetic sweep length of the signals from the detectors 44, 42 also vary.

Figure 8:
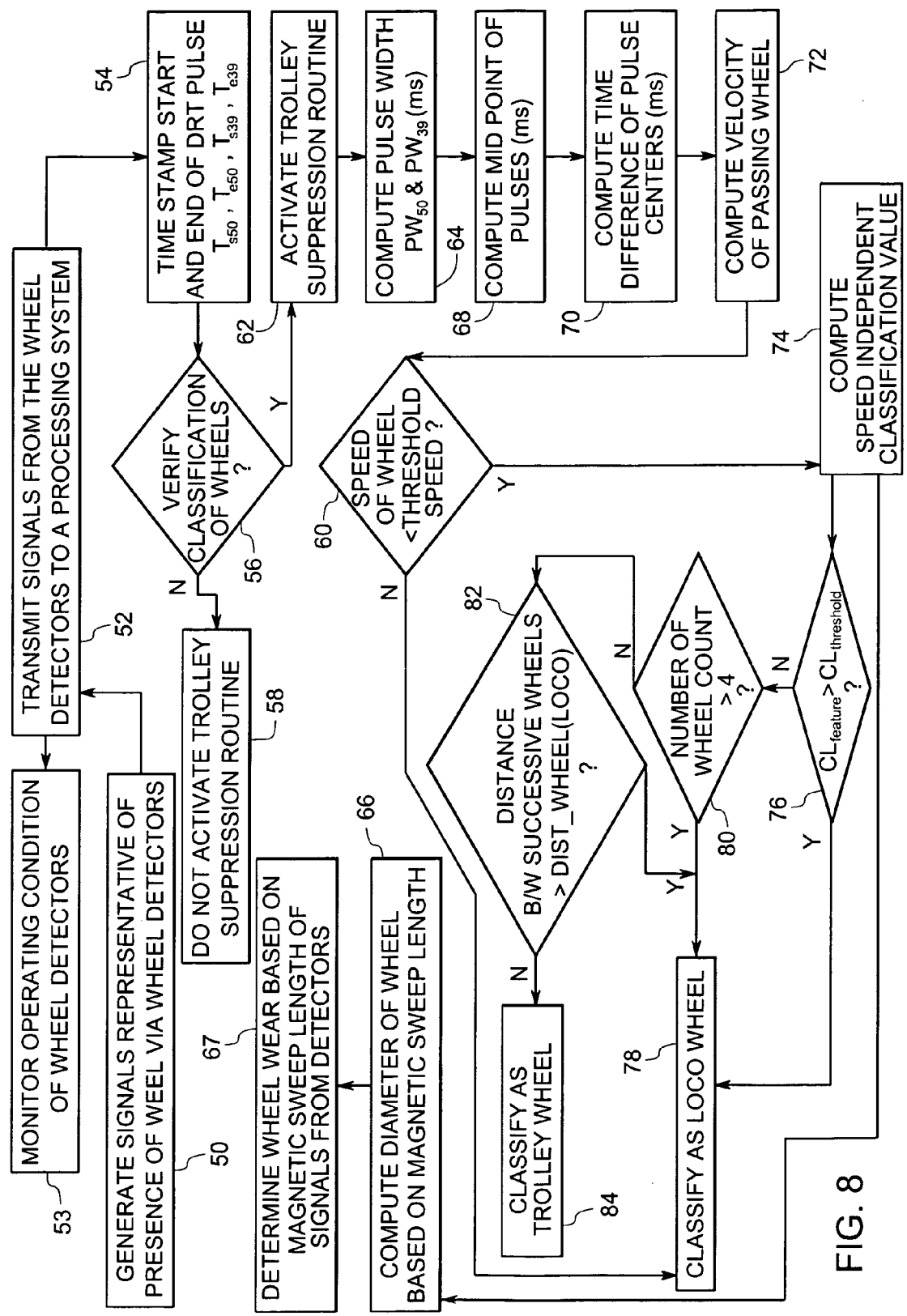
FIG. 8 is a flow chart illustrating exemplary steps involved in a method of detecting and classifying wheels of rail vehicles in accordance with an exemplary embodiment of the present technique.

FIG. 8 is a flow chart illustrating exemplary steps involved in method of detecting and classifying wheels of rail vehicles in accordance with exemplary embodiments of the present invention. The method includes generating signals representative of the presence of the wheel via the plurality of wheel detectors as represented by step 50. In the illustrated embodiment, the pair of magnetic wheel detectors 42, 44 having excitation frequencies of 50 KHz and 39 KHz respectively may be used. The signals representative of the presence of the wheel from the wheel detectors 42, 44 are transmitted to the processing system 26 as represented by step 52. The processing system 26 is configured to monitor the operating condition of the wheel detectors 42, 44 based on the ratio of magnetic sweep length of the signals from the detectors as represented by the step 53. As discussed above, for normal operating conditions of the detectors 42, 44, the ratio of the magnetic sweep length is either constant or varies within predetermined limits. For abnormal operating conditions of the detectors, the ratio of the magnetic sweep length tends towards zero, or any abnormal values. Times of start and end of the pulse signals from the detectors 42, 44 are monitored as represented by step 54. The start time of the signal from the wheel detector 42 is represented by $T_{s50}$ and the end time of the signal is represented by $T_{e50}$. Similarly, the start time of the signal from the wheel detector 44 is represented by $T_{s39}$ and the end time of the signal is represented by $T_{e39}$. The processing system is further configured to verify classification of the wheels based on the signals from the wheel detectors 42, 44 as represented by step 56. Factors such as vehicle transient movements, sensor failure, vandalism, and so forth may be analyzed to verify or disqualify the classification of the wheels. Certain exemplary verifying and classification (or disqualifying) scenarios are explained with reference to subsequent figures below. If the verifying factors are not satisfied, the trolley suppression routine is not activated as represented by step 58. If the verifying factors are satisfied, the trolley suppression routine is activated as represented by step 62. In certain instances, the transit of rail maintenance vehicles along the railway track causes the wheel detection system to determine that the track is occupied because the maintenance vehicles produces transit sequences not recognized as train transit sequences. It should be noted herein that the exemplary trolley suppression routine facilitates determination of whether tracks are clear through suppression of transit sequences made by rail maintenance vehicles such as trolleys, dollies, or the like. In certain exemplary embodiments, other routines such as traffic control routines may be initiated based on determination whether the track is clear. The information relating to determination of occupancy of track may be provided remotely for logging or remote control or monitoring operations.

The method further includes computing pulse width of the signals (measured in milli-seconds) represented by $PW_{50}$ and $PW_{39}$ corresponding to the detectors 42, 44 respectively as represented by step 64. The pulse width of the signal from the wheel detector 42 is represented by the relation:

$$PW_{50}=T_{e50}-T_{s50}.$$

The pulse width of the signal from the wheel detector 44 is represented by the relation:

$$PW_{39}=T_{e39}-T_{s39}.$$

Midpoints of pulse signals represented by $C_n50$ and $C_n39$ corresponding to the detectors 42, 44 respectively may be determined as represented by step 68 by the following relation:

$$C_n50 = \frac{T_{s50}+T_{e50}}{2};$$

$$C_n39 = \frac{T_{s39}+T_{e39}}{2}.$$

The time difference (DT) between the midpoint of the pulse signals $C_n50$ and $C_n39$ may then be computed as represented by step 70 based on the following relation:

$$DT=C_n50-C_n39$$

The velocity of the wheel ($V_{wheel}$) is computed as represented by step 72 based on the relation below:

$$V_{wheel} = \frac{dist_{DRT}}{DT}$$

where $dist_{DRT}$ is distance between the centerpoints 41, 43 of the wheel detectors 42, 44. The actual wheel speed is compared with a threshold speed as represented by step 60. If the actual wheel speed is greater than the threshold wheel speed, the wheel is classified as a locomotive wheel as represented by the step 78. If the actual wheel speed is less than the threshold wheel speed, a speed independent classification value ($CL_{feature}$) is calculated as represented by step 74 based on the following relation:

$$CL_{feature}=PW \times V_{wheel}$$

where PW represents pulse width of the signal from the wheel detector.

In certain exemplary embodiments, the pulse width of the signal from the detectors 42, 44 is a function of magnetic sweep length, detector excitation frequency, and linear velocity of the wheel. As represented by step 66, the diameter of the wheel is determined based on the following relations:

$$L_{mag}=2(R^2-(R-d_e)^2)^{1/2}$$

where R is the outer radius of the wheel flange and de is the effective depth of penetration of magnetic field inside the wheel flange, which would lead to generation of a pulse. $L_{mag}$ is the length of wheel interacting with the detector and is a characteristic of the wheel radius and depth of penetration of magnetic field. The overall length of the pulse is determined by the following relation and is referred to as characteristic magnetic sweep length for the wheel:

$$OL=L_{coil}+L_{mag}$$

where $L_{coil}$ is the length of the detector interacting with the wheel. The characteristic magnetic sweep length may also be further obtained based on the following relation:

$$OL=PWT \times V$$

where PWT is the time duration of the pulse output and V is the wheel speed.

The method also includes determining wheel wear condition based on magnetic sweep length of the signals from the wheel detectors as represented by the step 67. As discussed previously, the wheel diameter is a function of the magnetic sweep length. The interaction between the wheel flange and the wheel detector increases due to worn condition of the wheel. As a result, the magnetic sweep length of the signal from the wheel detector also increases. The worn condition of the wheel may be determined by comparing the estimated magnetic sweep length with the predetermined magnetic sweep length of the wheel.

The method further includes comparing the speed independent classification value ($CL_{feature}$) with one or more threshold wheel classification values ($CL_{threshold}$) as represented by step 76. On a present embodiment illustrated, if the speed independent classification value is greater than the threshold wheel classification value, the wheel is classified as a locomotive wheel as represented by step 78. If the speed independent classification value is greater than the threshold wheel classification value, the processing system compares the number of wheels with a threshold count (for example, 4) as represented by step 80. The number of wheels may be detected using a wheel counter. If the number of wheels is greater than (or equal to, as the case may be) the threshold count, the wheel is classified as locomotive wheel. If the number of wheels is less than the threshold count, the distance between successive wheels is compared with a threshold distance [dist_wheel(loco)] as represented by step 82. If the distance between successive wheels is greater than the threshold distance, the wheel is classified as a locomotive wheel. If the distance between successive wheels is less than the threshold distance, the wheel is classified as a trolley wheel as represented by step 84. As will be appreciated by those skilled in the art, the particular thresholds for size and numbers of wheels will depend upon the particular equipment used or anticipated by the rail system.

Figure 9:
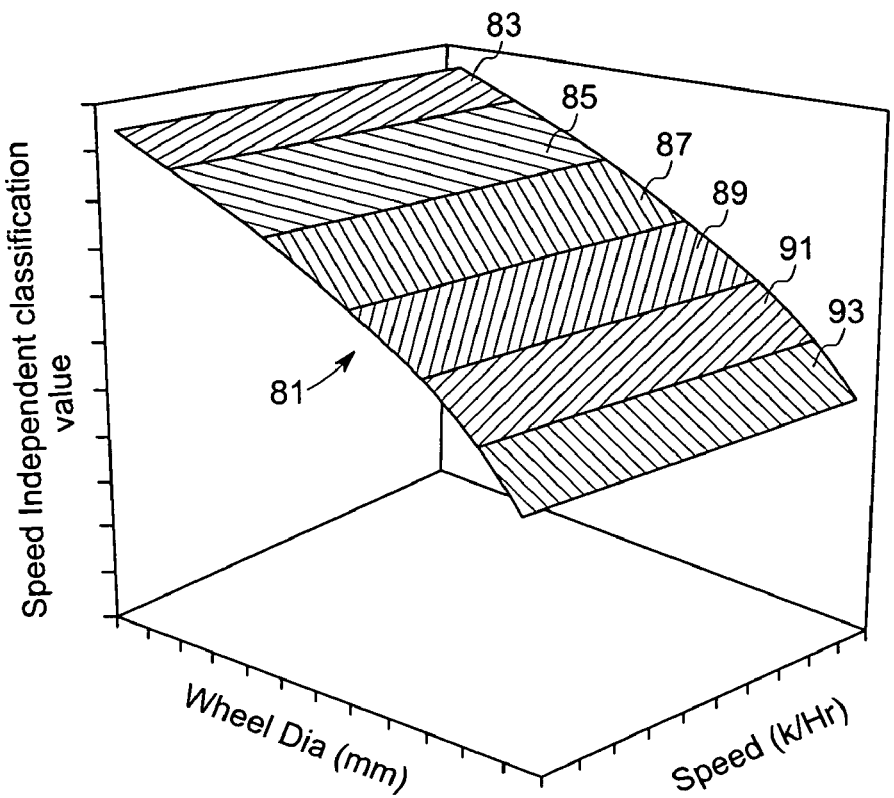
FIG. 9 is a graph illustrating variation of speed independent classification value, wheel diameter, and wheel speed in accordance with an exemplary embodiment of the present technique.

FIG. 9 is a graph illustrating variation between a speed independent classification value, wheel diameter, and wheel speed in accordance with certain exemplary embodiments of the present invention. The exemplary processing system estimates a wheel classification plane 81 based on the speed independent classification value, wheel diameter, and wheel speed. In the illustrated exemplary embodiment, the wheel classification plane 81 may be further classified into a plurality of plane sections 83, 85, 87, 89, 91, and 93. For example, if an intersection point of the wheel data including the speed independent classification value, wheel diameter, and wheel speed, coincides with the plane section 83, the wheel is classified as locomotive wheel. In another example, if an intersection point of the wheel data coincides with the plane sections 87, 91, the wheel may be classified as a trolley wheel. It should be noted herein that the illustrated wheel classification plane 81 is merely an example, and may vary depending on the application.

Figure 10:
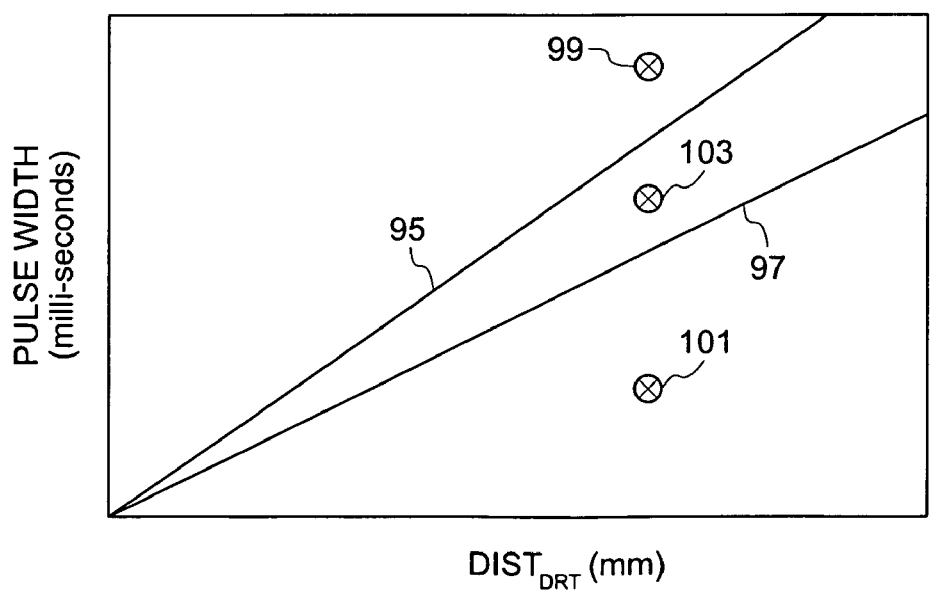
FIG. 10 is a graph illustrating variation of pulse width versus distance between center points of wheel detectors in accordance with an exemplary embodiment of the present technique.

FIG. 10 is a graph illustrating variation between pulse width (PW) of the signals from the wheel detectors versus distance ($dist_{DRT}$) between center points of the wheel detectors in accordance with certain exemplary embodiments of the present invention. The lines 95, 97 represent wheel classification planes. It should be noted herein that the wheel classification planes 95, 97 may vary dependent on the application i.e. based on wheel diameter and distance between center points of the wheel detectors. If a data point 99 corresponding to the wheel is above the wheel classification plane 95, the wheel may be classified as a locomotive wheel. If a data point 101 corresponding to the wheel is below the wheel classification plane 97, the wheel is classified as a trolley wheel. If a data point 103 corresponding to the wheel, is between the wheel classification planes 95, 97, the wheel is neither classified as a locomotive wheel nor a trolley wheel.

Figure 11:
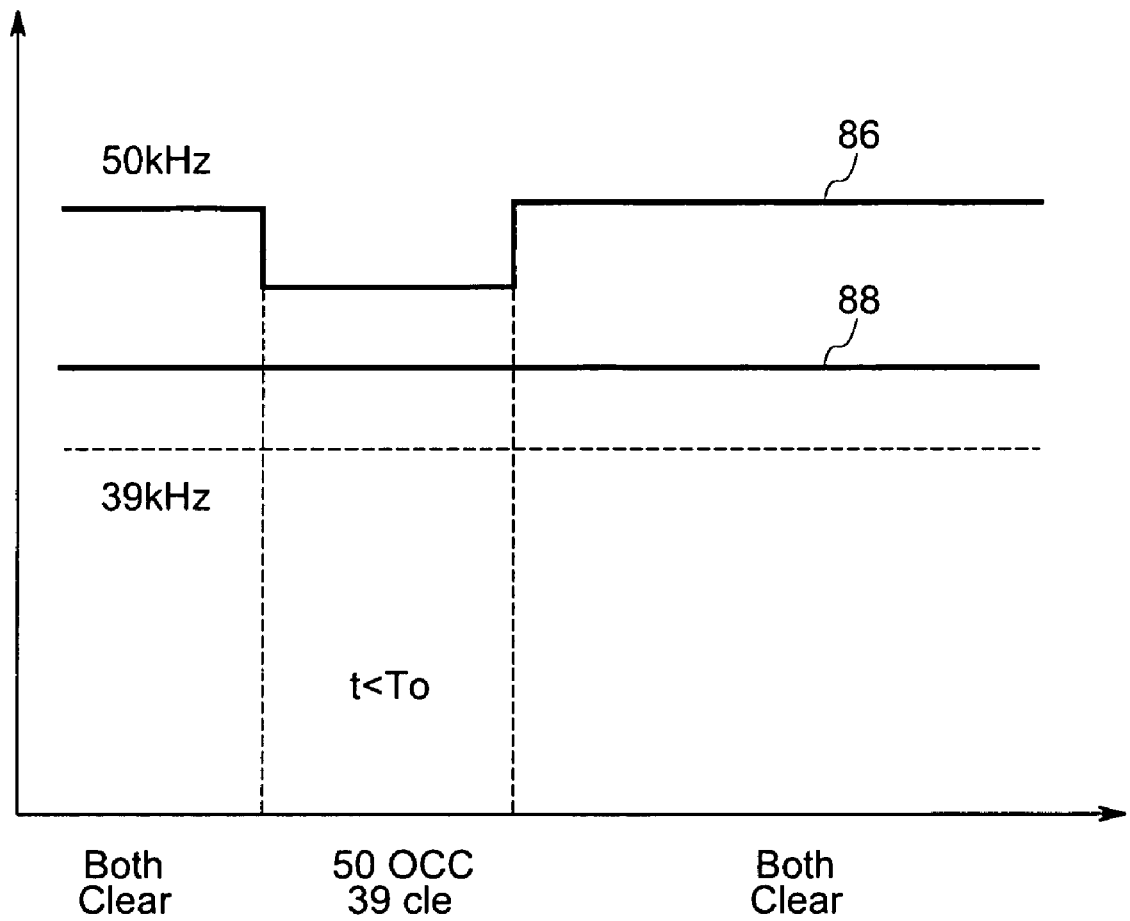
FIG. 11 is a graphical illustration of pulse signals as a function of time for a single occupation or occurrence of a wheel on a wheel detector for a time period less than a threshold time limit, used to classify or disqualify a classification of a wheel or wheel size determination in accordance with an exemplary embodiment of the present technique.

FIG. 11 is a graphical illustration of pulse signals as a function of time for a single occupation or occurrence of a wheel on a wheel detector for a time period less than a threshold time limit in accordance with certain embodiments of the present invention. As discussed above, the processing system is further configured to verify classification of the wheels based on the signals from the wheel detectors 42, 44. Factors that may be indicative of signal relationships that may put into question the classification, such as vehicle transient movements, sensor failure, vandalism, and so forth may be analyzed to verify or disqualify the classification of the wheels. In accordance with exemplary embodiments of the present invention, the processing system may, for example, verify detection of a trolley wheel.

In the illustrated embodiment, two pulse signals 86, 88 are output from the detectors 42, 44 respectively. Output signal 86 indicates a single occupation or occurrence of a wheel on the wheel detector 42 for a duration less than a threshold time limit ($T_0$). The wheel occupation may result from the presence of a locomotive or a trolley, for example. The pulse signal 88 indicates that there is no occurrence of a wheel on the wheel detector 44. In the illustrated embodiment, the occupation is not classified as a trolley.

Figure 12:
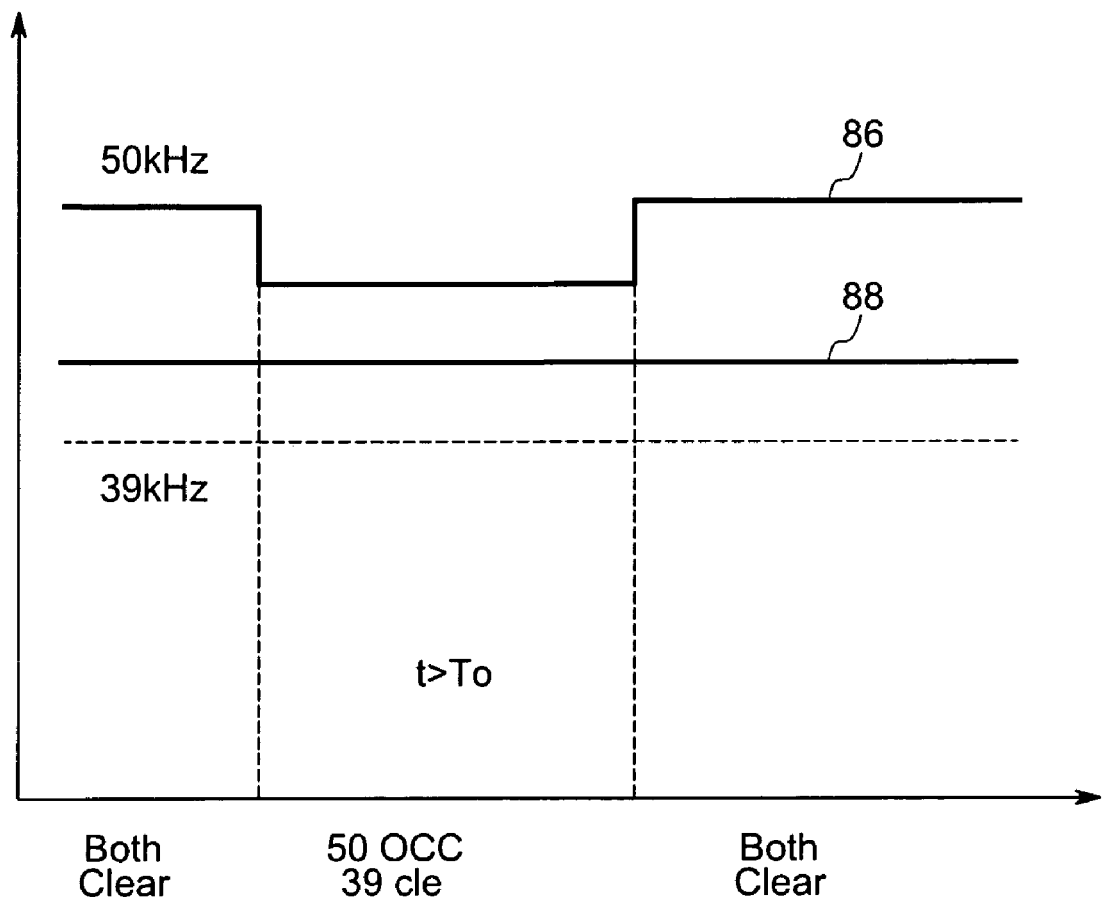
FIG. 12 is a graphical illustration of pulse signals as a function of time for a single occupation or occurrence of a wheel on a wheel detector for a time period greater than a threshold time limit in accordance with an exemplary embodiment of the present technique.

FIG. 12 is a graphical illustration of pulse signals as a function of time for a single occupation or occurrence of a wheel on a wheel detector for a time period greater than a threshold time limit in accordance with an exemplary embodiment of the present invention. In the illustrated embodiment, two pulse signals 86, 88 are output from the detectors 42, 44 respectively. Output signal 86 indicates a single occupation or occurrence of a wheel on the wheel detector 42 for duration greater than a threshold time limit ($T_0$). Again, the wheel occupation may result by a locomotive or a trolley, for example. The pulse signal 88 indicates that there is no occurrence of wheel on the wheel detector 44. In the illustrated embodiment, the wheel occupation on the detector 42 is classified as a train.

Figure 13:
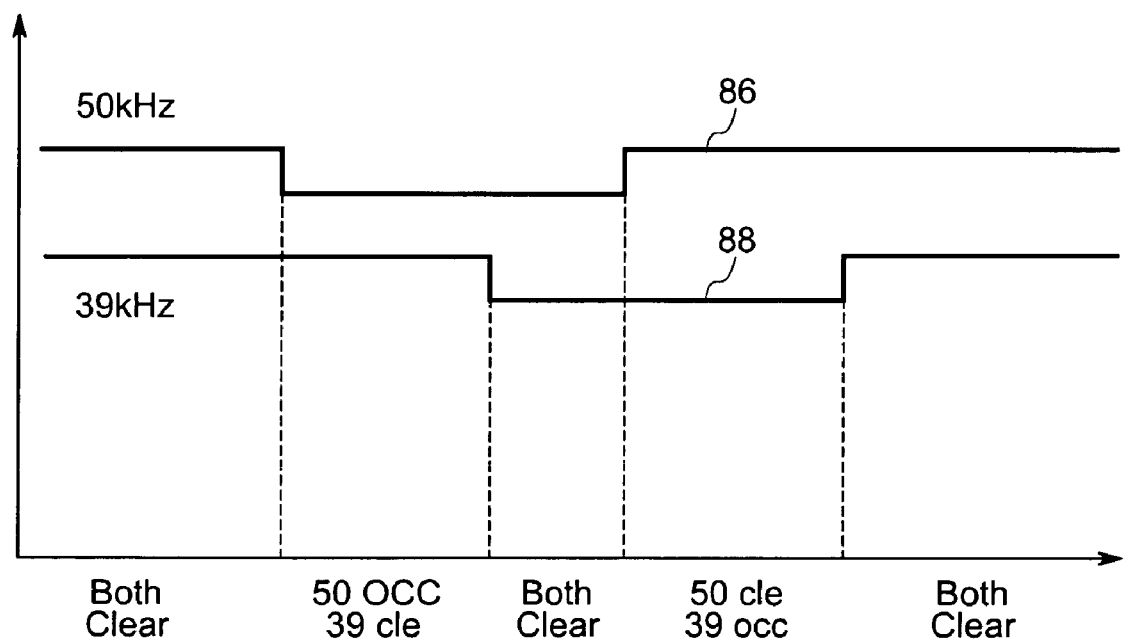
FIG. 13 is a graphical illustration of pulse signals as a function of time for a sequence of two single occupations or occurrences of a wheel on two wheel detectors in accordance with an exemplary embodiment of the present technique.

FIG. 13 is a graphical illustration of pulse signals as a function of time for a sequence of two single occupations or occurrences of a wheel on two wheel detectors in accordance with an exemplary embodiment of the present invention. In the illustrated embodiment, two pulse signals 86, 88 are output from the detectors 42, 44 respectively. The pulse signals 86, 88 indicate a correct sequence of two single contemporaneous occupations or occurrences of a wheel on the two wheel detectors 42, 44. The illustrated sequence indicates one wheel count and may be generated by a locomotive or a trolley. Vandalism is not taken into consideration in the illustrated scenario. In the illustrated embodiment, the wheel classification algorithm is initiated and the wheels are classified as train wheels or trolley wheels by comparing the number of wheels and distance between successive wheels with predetermined threshold limits. As discussed earlier, if the number of wheels is less than the threshold count limit and distance between successive wheels is less than the threshold distance limit, the occupation is identified as a trolley and suppressed.

Figure 14:
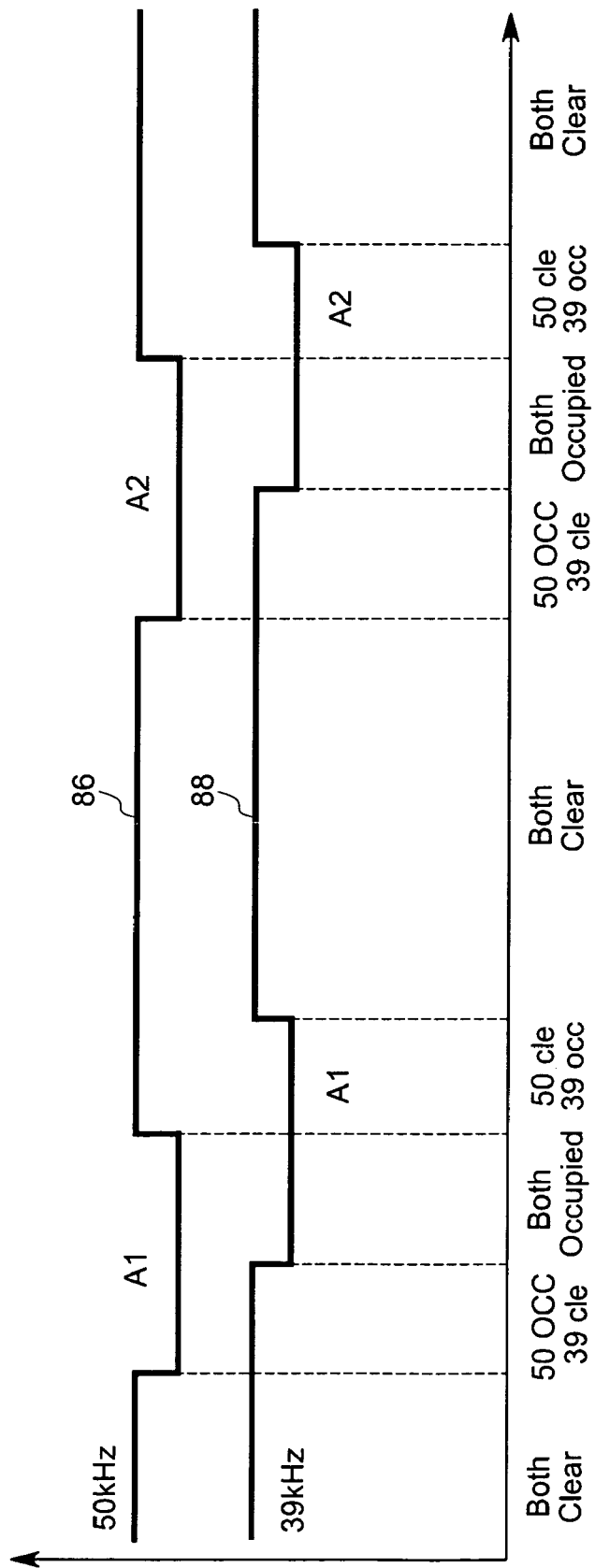
FIG. 14 is a graphical illustration of pulse signals as a function of time for two sequences of two occupations or occurrences of two wheels on two wheel detectors in accordance with an exemplary embodiment of the present technique.

FIG. 14 is a graphical illustration of pulse signals as a function of time for two sequences of two occupations or occurrences of two wheels on two wheel detectors in accordance with an exemplary embodiment of the present invention. In the illustrated embodiment, two pulse signals 86, 88 are output from the detectors 42, 44 respectively. The pulse signals 86, 88 indicate two correct sequences of two contemporaneous single occupations or occurrences of two wheels A1, A2 on the two wheel detectors 42, 44. The illustrated sequence indicates count of two wheels and may be generated by a locomotive or a trolley. Vandalism is not taken into consideration in the illustrated scenario. In the illustrated embodiment, the wheel classification algorithm is initiated and the wheels are classified as train wheels or trolley wheels by comparing the number of wheels and distance between successive wheels with predetermined threshold limits. If the number of wheels is less than the threshold count limit and distance between successive wheels is less than the threshold distance limit, the occupation is identified as a trolley and suppressed.

Figure 15:
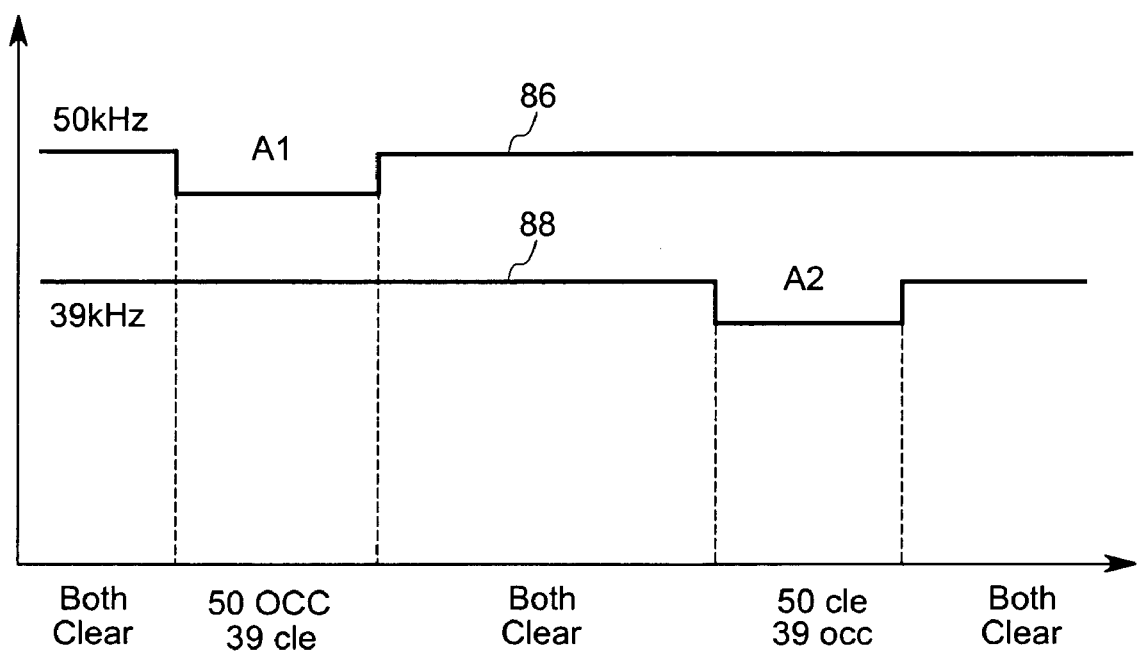
FIG. 15 is a graphical illustration of pulse signals as a function of time for a disjoined sequence of two wheels on two wheel detectors in accordance with an exemplary embodiment of the present technique.

FIG. 15 is a graphical illustration of pulse signals as a function of time for a disjoined sequence of two wheels on two wheel detectors in accordance with an exemplary embodiment of the present invention. In the illustrated embodiment, two pulse signals 86, 88 are output from the detectors 42, 44 respectively. The pulse signals 86, 88 indicate that a wheel A1 occupies the wheel detector 42 and another wheel A2 occupies the wheel detector 44. The illustrated sequence indicates that no wheels are counted and may be generated by only a trolley, for example. However, in the illustrated embodiment, the occupation is not classified as a trolley.

Figure 16:
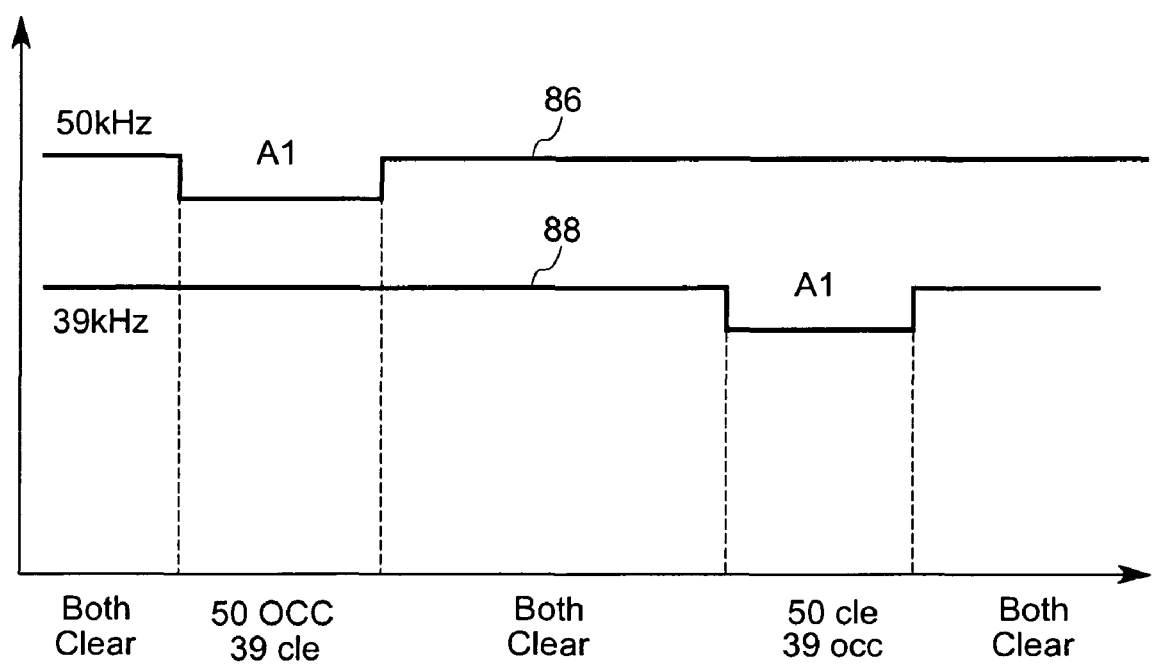
FIG. 16 is a graphical illustration of pulse signals as a function of time for a disjoined sequence of one wheel on two wheel detectors in accordance with an exemplary embodiment of the present technique.

FIG. 16 is a graphical illustration of pulse signals as a function of time for a disjoined sequence of one wheel on two wheel detectors in accordance with an exemplary embodiment of the present invention. In the illustrated embodiment, two pulse signals 86, 88 are output from the detectors 42, 44 respectively. The pulse signals 86, 88 indicate that a wheel A1 occupies both the detectors 42, 44. The illustrated sequence indicates that no wheels are counted and may be generated by only a trolley, for example. However, in the illustrated embodiment, the occupation is not classified as a trolley.

Figure 17:
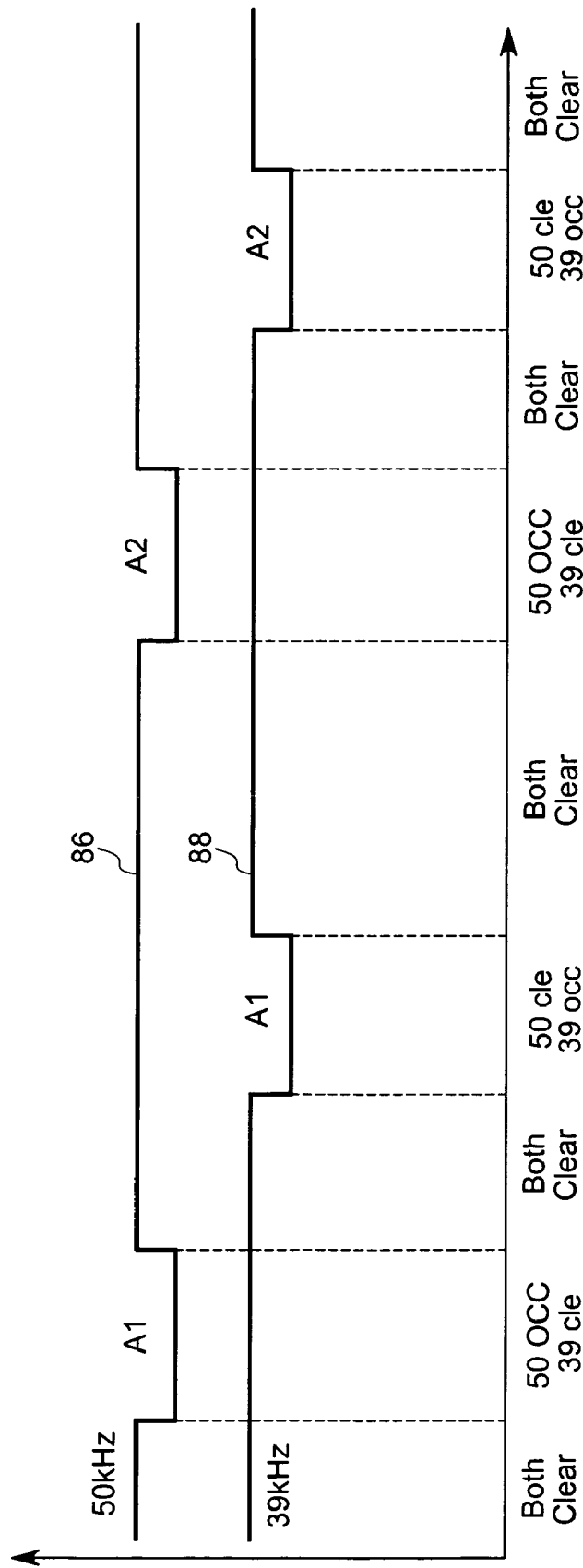
FIG. 17 is a graphical illustration of pulse signals as a function of time for two disjoined sequences of two wheels on two wheel detectors in accordance with an exemplary embodiment of the present technique.

FIG. 17 is a graphical illustration of pulse signals as a function of time for two disjoined sequences of two wheels on two wheel detectors in accordance with an exemplary embodiment of the present invention. In the illustrated embodiment, two pulse signals 86, 88 are output from the detectors 42, 44 respectively. The pulse signals 86, 88 indicate that a wheel A1 occupies both the detectors 42, 44. Similarly wheel A2 occupies both the detectors 42, 44. The illustrated sequence indicates that no wheels are counted and may be generated by only a trolley, for example. In the illustrated embodiment, the occupation is classified as trolley or train by comparing classification factors such as wheel speed, occupation length, and distance between successive wheels with predetermined threshold limits. If the wheel speed is less than the threshold speed limit, and occupation length is less than the threshold occupation length, and distance between successive wheels is less than the threshold distance limit, the occupation is classified as trolley and suppressed.

Figure 18:
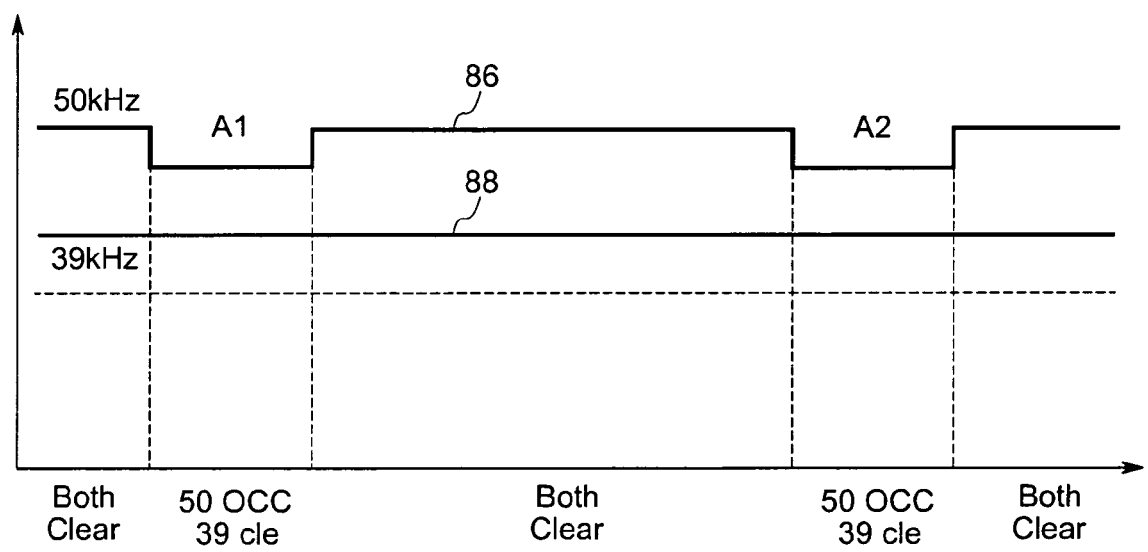
FIG. 18 is a graphical illustration of pulse signals as a function of time for a sequence of one or more wheels on one wheel detector in accordance with an exemplary embodiment of the present technique.

FIG. 18 is a graphical illustration of pulse signals as a function of time for a sequence of one or more wheels on one wheel detector in accordance with an exemplary embodiment of the present invention. In the illustrated embodiment, two pulse signals 86, 88 are output from the detectors 42, 44 respectively. The pulse signals 86, 88 indicate that two wheels A1, A2 make multiple occupations on the wheel detector 42, whereas no wheels occupy the detector 44. The illustrated sequence indicates that no wheels are counted and may be generated by a trolley only, for example. However, in the illustrated embodiment, the occupation is not classified as trolley.

Figure 19:
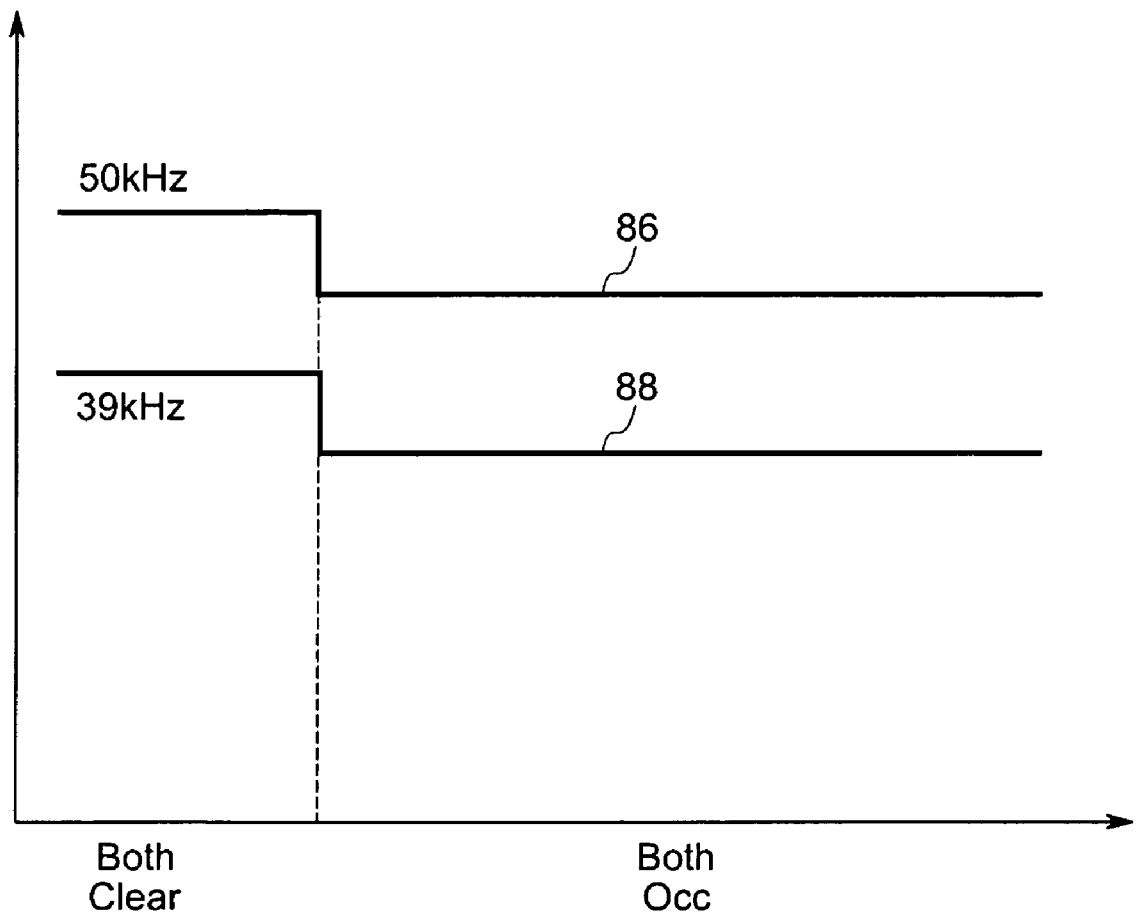
FIG. 19 is a graphical illustration of pulse signals as a function of time for a sequence generated by a failure that causes contemporary occupation on two wheel detectors simultaneously in accordance with an exemplary embodiment of the present technique.

FIG. 19 is a graphical illustration of pulse signals as a function of time for a sequence generated by a failure that causes contemporary occupation on two wheel detectors simultaneously in accordance with an exemplary embodiment of the present invention. In the illustrated embodiment, two pulse signals 86, 88 are output from the detectors 42, 44 respectively. The pulse signals 86, 88 indicate a failure that causes a contemporaneous occupation on both the detectors 42, 44. The illustrated sequence indicates that no wheels are counted and may be generated by a failure or vandalism only. Failure scenarios may include sensor fault, cracks in the rail or the wheel, dirt coating on the wheels, or the like. In the illustrated embodiment, the wheel identification and classification algorithm is not activated.

FIG. 20 is a graphical illustration of pulse signals as a function of time for a sequence generated by a failure that causes permanent occupation on two wheel detectors simultaneously in accordance with an exemplary embodiment of the present invention. In the illustrated embodiment, two pulse signals 86, 88 are output from the detectors 42, 44 respectively. The pulse signals 86, 88 indicate that initially detector 42 is occupied whereas the detector 44 is clear. After certain time period, the detector 44 is also occupied. Thereafter both the detectors 42, 44 are occupied. The illustrated sequence indicates that no wheels are counted and may be generated by a locomotive, or trolley, or failure, or vandalism. In the illustrated embodiment, the wheel identification and classification algorithm is not activated.

It should be noted herein the exemplary embodiments illustrated in FIGS. 11-20 are examples of scenarios evaluated to identify any potential risks associated with the introduction of trolley suppression technique. The exemplary embodiments illustrated in FIGS. 13 and 16 involve detection of transit of two wheels via the detectors 42, 44 and is a requirement for activation of trolley suppression technique. The exemplary embodiments illustrated in FIGS. 10-12, 14-15, and 17-18 involve detection of only one wheel. As a result, the trolley suppression technique is not activated.

FIG. 21 is a flow chart illustrating exemplary steps involved in method of declassifying or disqualifying classification of trolley wheels in accordance with certain exemplary embodiments of the present invention. The method includes generating signals representative of presence of the wheels via the plurality of wheel detectors as represented by the step 90. In the illustrated embodiment, a pair of magnetic wheel detectors having mutually different excitation frequencies may be used. The signals representative of the presence of the wheels from the wheel detectors are transmitted to the processing system 26 as represented by the step 92. The method further includes verifying classification of the wheels based on the signals from the wheel detectors as represented by the step 94. Factors such as vehicle transient movements, sensor failure, vandalism, may be analyzed to verify or disqualify the classification of the wheels.

In the illustrated embodiment, an occupation length (magnetic sweep length) of a first wheel of the rail vehicle is compared to a threshold length limit as represented by the step 96. If the occupation length of the first wheel is greater than the threshold length limit, the wheel is classified as a locomotive wheel. If the occupation length of the first wheel is less than the threshold length limit, the speed of the first wheel is compared to a threshold speed limit as represented by the step 100. If the speed of the first wheel is greater than the threshold speed limit, the wheel is classified as a locomotive wheel. If the speed of the first wheel is less than the threshold speed limit, the first wheel is identified as a potential trolley wheel as represented by the step 102. The method further includes comparing occupation length of a second wheel of the rail vehicle with a threshold length limit as represented by the step 104. In the illustrated embodiment, the first wheel and second wheel are successive wheels of the rail vehicle. If the occupation length of the second wheel is greater than the threshold length limit, the wheel is classified as a locomotive wheel. If the occupation length of the second wheel is less than the threshold length limit, the speed of the second wheel is compared with a threshold speed limit as represented by the step 106. If the speed of the second wheel is greater than the threshold speed limit, the wheel is classified as a locomotive wheel. If the speed of the second wheel is less than the threshold speed limit, the second wheel is identified as a potential trolley wheel as represented by the step 108.

The distance between the first and second wheels is compared with a threshold distance limit as represented by the step 110. If the distance between the first and second wheels is greater than the threshold distance limit, the wheels are classified as locomotive wheels. If the distance between the first and second wheels is less than the threshold distance limit, the trolley suppression routine is activated as represented by the step 112. The system in accordance with the embodiments of the present invention facilitates to distinguish various objects on the railway track and enable indication of clear railway track during presence of wheels of push trolleys, dip lorries, rail dollies, or the like.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for detecting and classifying a wheel of a rail vehicle traveling on a railway track comprising:
    a plurality of wheel detectors coupled to one rail of the railway track and configured to detect presence of the wheel and to generate signals representative thereof; and
    a processing system coupled to the wheel detectors and configured to receive and process the signals, wherein the processing system is configured to calculate a pulse width of the signals from each wheel detector;
    wherein the processing system is configured to classify the wheel based on a speed independent classification value calculated based on the signals from the wheel detectors, wherein the speed independent classification value is a calculated diameter of the wheel; and
    wherein the processing system is configured to compare the calculated diameter of the wheel with a threshold value to classify the wheel.

2. The system of claim 1, further comprising at least one power source coupled to the wheel detectors and configured to supply electric power to the wheel detectors.

3. The system of claim 1, wherein the processing system is configured to verify classification of the wheel based on a transit movement of the rail vehicle on the railway track.

4. The system of claim 3, wherein the processing system is configured to disqualify classification of the wheel based on the transit movement of the rail vehicle on the railway track.

5. The system of claim 1, wherein the processing system is configured to calculate a mid-point of the signals from each wheel detector.

6. The system of claim 5, wherein the processing system is configured to calculate a time difference based on the mid-point of the signals from each wheel detector.

7. The system of claim 6, wherein the wheel detectors comprise a first wheel detector and a second wheel detector; and wherein the processing system is configured to calculate a first center point and a second center point of the signals from the first wheel detector and the second wheel detector, respectively.

8. The system of claim 7, wherein the processing system is configured to calculate a velocity of the wheel based on the time difference and a distance between the first center point and the second center point.

9. The system of claim 8, wherein the processing system is configured to calculate a speed independent classification value based on the velocity of the wheel and the pulse width of the signal from each wheel detector.

10. The system of claim 9, wherein the wheel is classified as a locomotive wheel when the speed independent classification value is greater than the threshold wheel classification value.

11. The system of claim 10, wherein the processing system is configured to compare a number of wheels of the rail vehicle to a threshold wheel count limit to classify the wheel; and wherein the wheel is classified as a locomotive wheel when the number of wheels of the rail vehicle is greater than the threshold wheel count limit.

12. The system of claim 11, wherein the processing system is configured to compare a distance between adjacent wheels of the rail vehicle to a threshold distance limit; and wherein the wheel is classified as a locomotive wheel when the distance between adjacent wheels is greater than the threshold distance limit and as a trolley wheel when the distance between mutually adjacent wheels is smaller than the threshold distance limit.

13. A system for detecting and classifying a wheel of a rail vehicle traveling on a railway track comprising:
    a plurality of wheel detectors coupled to one rail of the railway track and configured to detect presence of the wheel and to generate signals representative thereof; and
    a processing system coupled to the wheel detectors and configured to receive and process the signals;
    wherein the processing system is configured to classify the wheel based on a speed independent classification value calculated based on the signals from the wheel detectors;
    wherein the processing system is configured to calculate a pulse width of the signals from each wheel detector;
    wherein the processing system is configured to calculate a mid-point of the signals from each wheel detector;
    wherein the processing system is configured to calculate a time difference based on the mid-point of the signals from each wheel detector;
    wherein the wheel detectors comprise a first wheel detector and a second wheel detector; and wherein the processing system is configured to calculate a first center point and a second center point of the signals from the first wheel detector and the second wheel detector, respectively;
    wherein the processing system is configured to calculate a velocity of the wheel based on the time difference and a distance between the first center point and the second center point;
    wherein the processing system is configured to calculate a speed independent classification value based on the velocity of the wheel and the pulse width of the signal from each wheel detector;
    wherein the processing system is configured to compare the speed independent classification value with a threshold wheel classification value to classify the wheel; and
    wherein the wheel is classified as a locomotive wheel when the speed independent classification value is greater than the threshold wheel classification value; and
    wherein the processing system is configured to estimate a magnetic sweep length of the signals from the wheel detectors.

14. A system for detecting and classifying a wheel of a rail vehicle traveling on a railway track comprising:
    a plurality of wheel detectors coupled to one rail of the railway track and configured to detect presence of the wheel and to generate signals representative thereof; and
    a processing system coupled to the wheel detectors and configured to receive and process the signals;

wherein the processing system is configured to classify the wheel based on a speed independent classification value calculated based on the signals from the wheel detectors;

wherein the processing system is configured to calculate a pulse width of the signals from each wheel detector;

wherein the processing system is configured to calculate a mid-point of the signals from each wheel detector;

wherein the processing system is configured to calculate a time difference based on the mid-point of the signals from each wheel detector;

wherein the wheel detectors comprise a first wheel detector and a second wheel detector; and wherein the processing system is configured to calculate a first center point and a second center point of the signals from the first wheel detector and the second wheel detector, respectively;

wherein the processing system is configured to calculate a velocity of the wheel based on the time difference and a distance between the first center point and the second center point;

wherein the processing system is configured to calculate a speed independent classification value based on the velocity of the wheel and the pulse width of the signal from each wheel detector;

wherein the processing system is configured to compare the speed independent classification value with a threshold wheel classification value to classify the wheel; and wherein the wheel is classified as a locomotive wheel when the speed independent classification value is greater than the threshold wheel classification value;

wherein the processing system is configured to estimate a magnetic sweep length of the signals from the wheel detectors; and wherein the processing system is configured to determine a diameter of the wheel based on a magnetic sweep length of the signals.

15. The system of claim 14, wherein the processing system is configured to determine a wheel classification plane based on the speed independent classification value, the velocity of the wheel, and the diameter of the wheel.

16. A system for detecting and classifying a wheel of a rail vehicle traveling on a railway track comprising:

a plurality of wheel detectors coupled to one rail of the railway track and configured to detect presence of the wheel and to generate signals representative thereof: and a processing system coupled to the wheel detectors and configured to receive and process the signals;

wherein the processing system is configured to classify the wheel based on a calculated magnetic sweep length of the signals from the wheel detectors; and wherein the processing system is configured to calculate the magnetic sweep length based on the velocity of the wheel and the pulse width of the signal from each wheel detector.

17. A system for detecting and classifying a wheel of a rail vehicle traveling on a railway track comprising:

a plurality of wheel detectors coupled to one rail of the railway track and configured to detect presence of the wheel and to generate signals representative thereof; and a processing system coupled to the wheel detectors and configured to receive and process the signals;

wherein the processing system is configured to classify the wheel based on a diameter of the wheel calculated based on the signals from the wheel detectors; and wherein the processing system is configured to compare a number of wheels of the rail vehicle to a threshold wheel count limit to classify the wheel; and wherein the wheel is classified as a locomotive wheel when the number of wheels of the rail vehicle is greater than the threshold wheel count limit.

18. The system of claim 17, wherein the processing system is configured to determine the calculated diameter of the wheel based on the velocity of the wheel and the pulse width of the signal from each wheel detector.

* * * * *